United States Patent [19]
Guibord et al.

[11] 3,933,214
[45] Jan. 20, 1976

[54] ALL TERRAIN PLEASURE VEHICLE

[76] Inventors: Georges E. Guibord, 462 Edwards St., Rockland, Ontario; Marcel P. Guibord, 72 - 6th Ave., Apt., 6, Ile Perrot, Quebec, both of Canada

[22] Filed: Jan. 30, 1975

[21] Appl. No.: 545,663

Related U.S. Application Data

[63] Continuation of Ser. No. 377,852, July 9, 1973, abandoned.

[30] Foreign Application Priority Data
July 12, 1972 Canada .............................. 146933

[52] U.S. Cl. ............................... 180/9.2 R; 305/24
[51] Int. Cl.² ......................................... B62D 55/00
[58] Field of Search .................... 180/9.2, 9.5, 9.54; 305/10, 22, 24, 27, 29, 30–32, 35 EB; 74/229, 230.5, 230.7

[56] References Cited
UNITED STATES PATENTS

| | | | |
|---|---|---|---|
| 1,107,874 | 8/1914 | Appleby | 305/24 |
| 1,959,477 | 5/1934 | Kegresse | 305/22 |
| 2,998,667 | 1/1955 | Kropp | 180/9.2 R |
| 3,439,763 | 4/1964 | Pederson | 305/35 EB |

*Primary Examiner*—Philip Goodman

[57] ABSTRACT

A half track attachment for a vehicle comprises a pair of driving wheels having a plurality of circumferentially aligned protrusion receiving holes, a pair of endless tracks for mounting about said driving wheels, the tracks having a plurality of longitudinally aligned protrusions for coaction with the said holes and a pair of auxiliary wheels spaced from the driving wheels for guiding the track.

5 Claims, 16 Drawing Figures

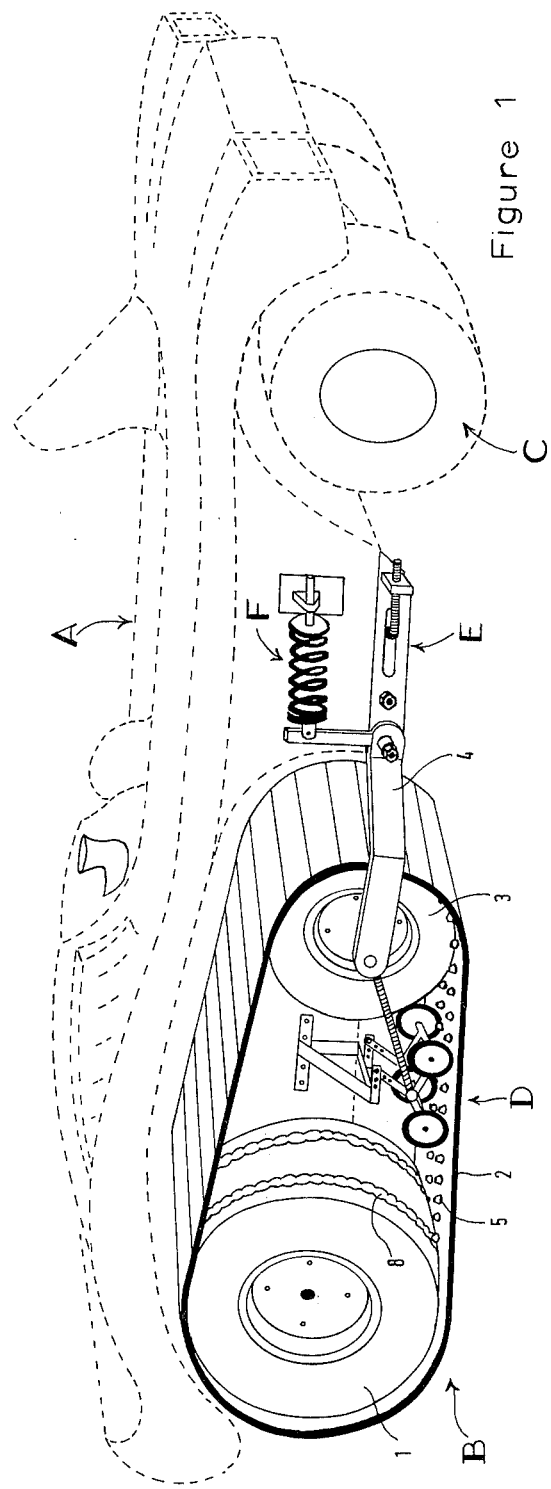
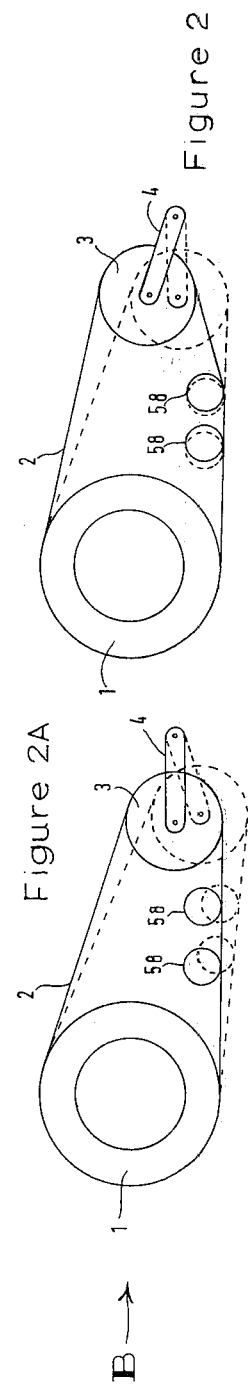

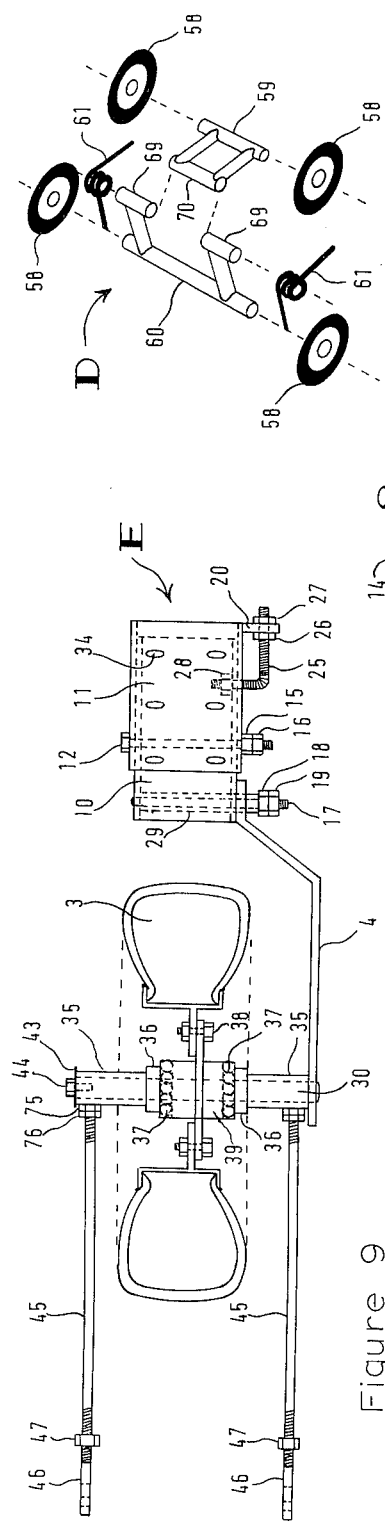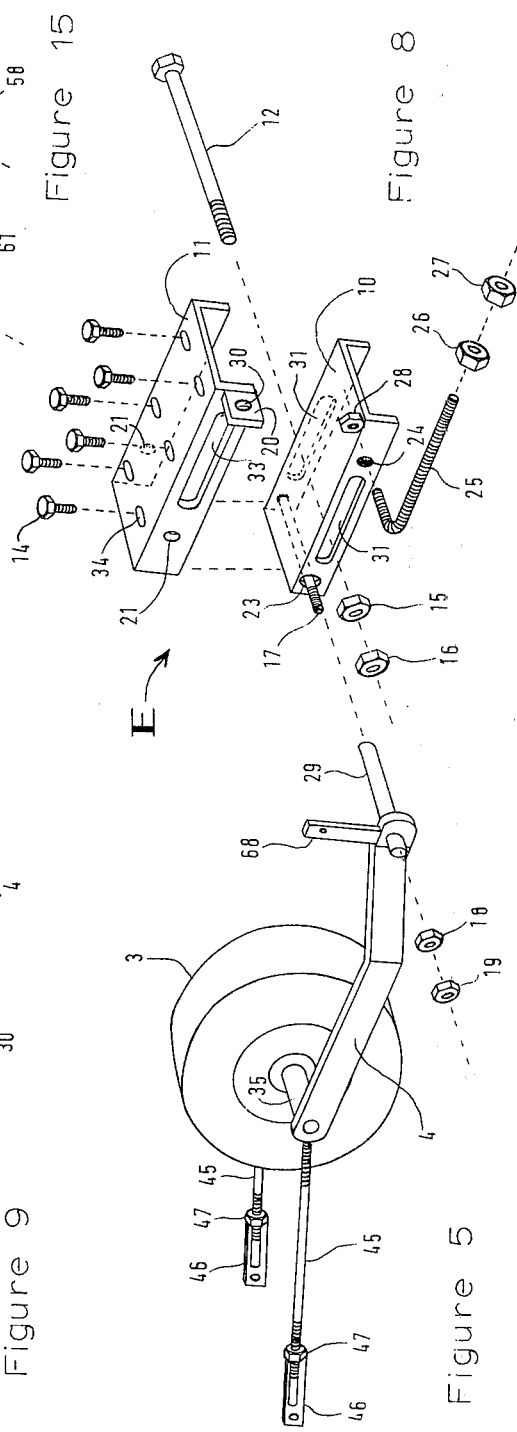

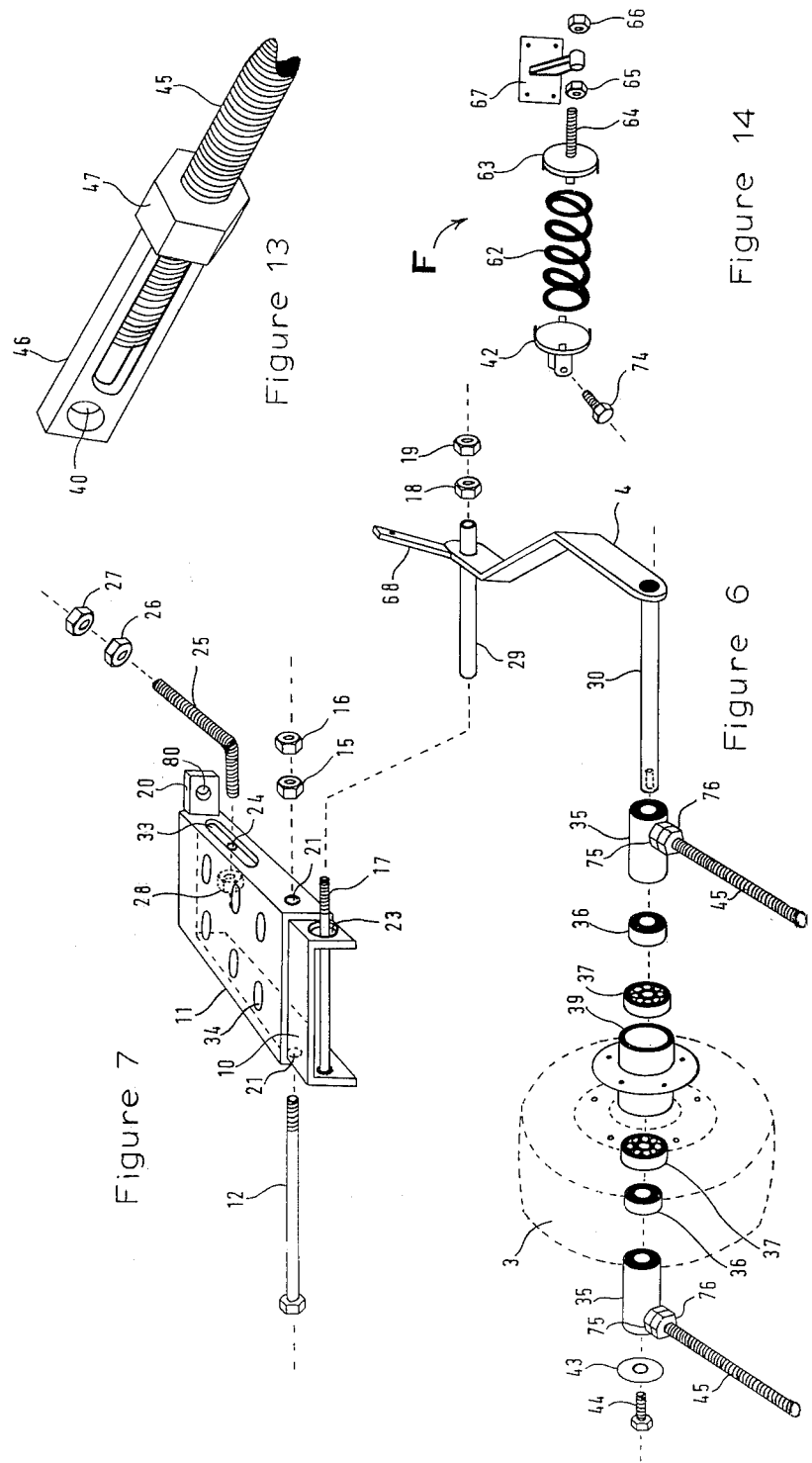

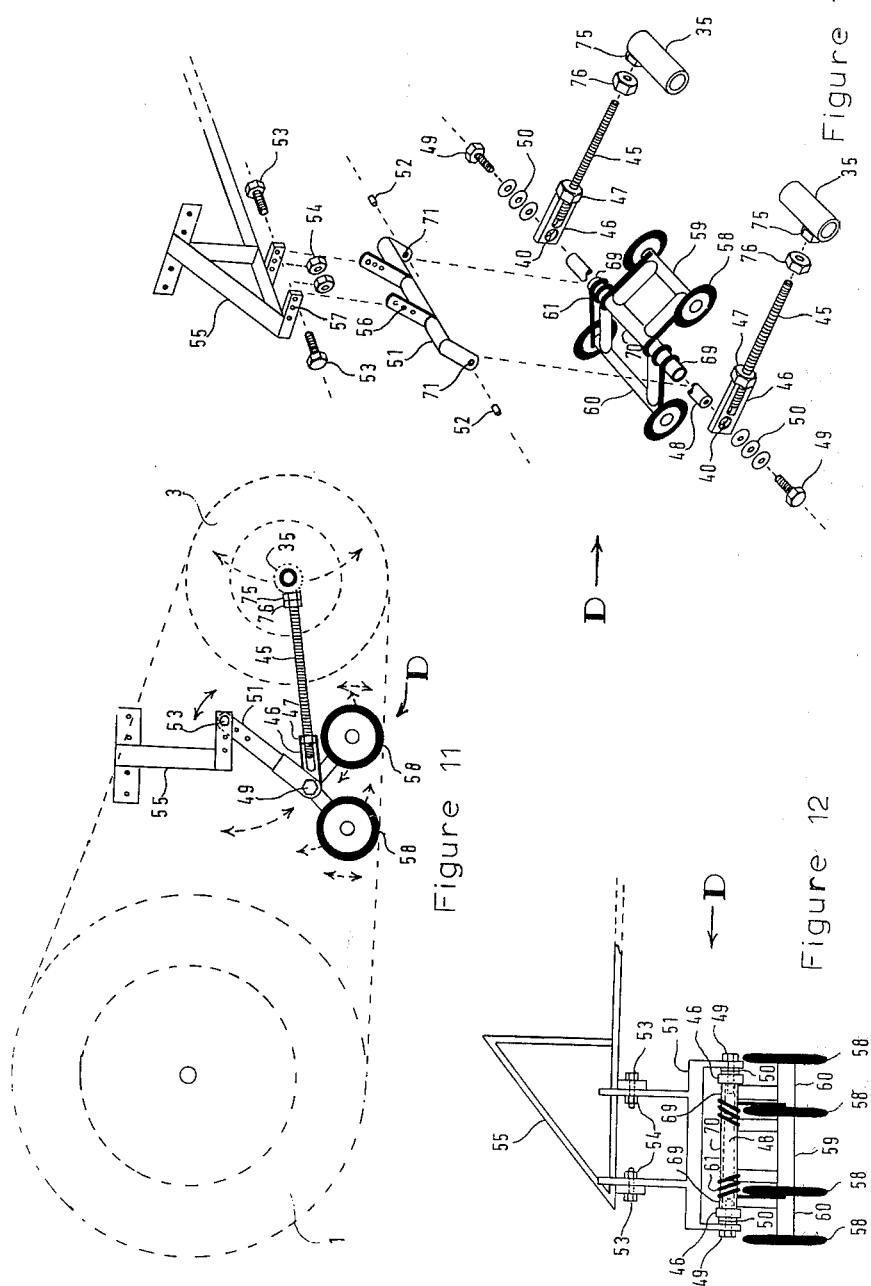

ALL TERRAIN PLEASURE VEHICLE

This is a continuation of application Ser. No. 377,852 filed, July 9, 1973, now abandoned.

The present invention relates in general to motorized vehicles and in particular to all terrain-vehicles having a track system adapted to be carried by the driving wheels of such vehicles.

Many all-terrain vehicles are now available on the market, some of which use an endless track system, while others use very low pressure tires for providing the necessary support for the vehicle when travelling over rough terrain or through swamps. Such vehicles have in the past had some drawbacks when it came to their use in terrain which was snowcovered, sandy or boggy. For example, many such vehicles are limited in their ability to climb steep hills under such conditions and their top speed in snow is quite limited.

The present invention overcomes these various problems for wheeled vehicles by providing an endless track adapted to be carried by the rear driving wheels of a vehicle, the track also being carried by auxiliary wheels spaced preferably a short distance in front of the driving wheels. The track is guided by a simple mechanism on the driving and auxiliary wheels, slippage between the track and the driving wheels being prevented by the guiding system. Since there is negligible slippage between the driving wheels and the track, the vehicle is capable of maintaining a high speed not only over solid ground but also through snow and over other less-than-solid ground surfaces.

The present invention includes an endless track having on the inside surface thereof a plurality of inwardly projecting cones, which cones interact with a series of inwardly directed cone receiving holes in the driving wheel. The cones are aligned on the track in a pair of parallel lines, the separation between the lines of cones being sufficient to just receive the auxiliary wheel, thereby preventing any sideways relative movement between the track and the auxiliary wheel. The cone receiving holes in the driving wheels appear as a pair of parallel circumferential grooves in each wheel, having a somewhat corrugated appearance along the sides thereof due to the very close proximity of the individual holes. Means are also provided for aligning the auxiliary wheels transversely and longitudinally of the vehicle and for adjusting the tautness of the track.

The invention will now be described in more detail with reference to the drawings wherein:

FIG. 1 is a perspective view of the track system of the present invention as attached to a vehicle, the vehicle being shown in outline.

FIGS. 2 and 2a are side views of the track system of the present invention showing respectively in broken line the raised and lowered aspects of the auxiliary wheel.

FIG. 5 is a perspective view of the auxiliary wheel and auxiliary wheel pivot arm assembly.

FIG. 6 is an exploded view of the auxiliary wheel and auxiliary wheel pivot arm assembly.

FIG. 7 is a perspective partially exploded view of the auxiliary wheel pivot arm support and track adjustment mechanism.

Figure 4:
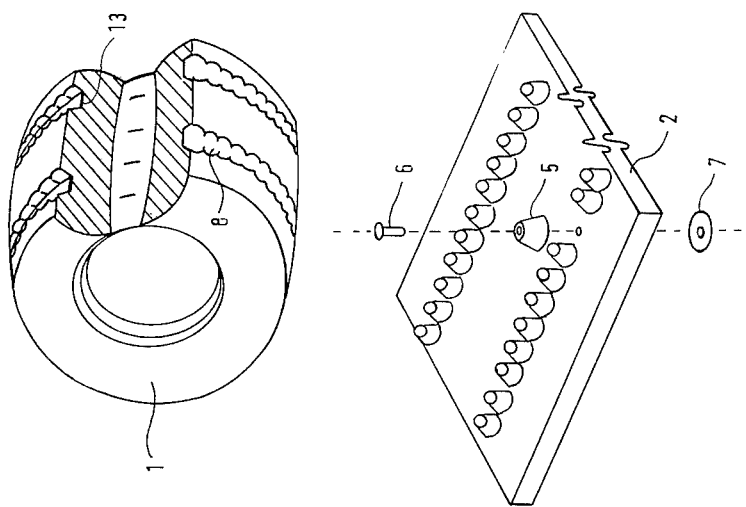
FIG. 4 shows the track construction and details of the cone receiving grooves in the driving wheel.
Figure 3:
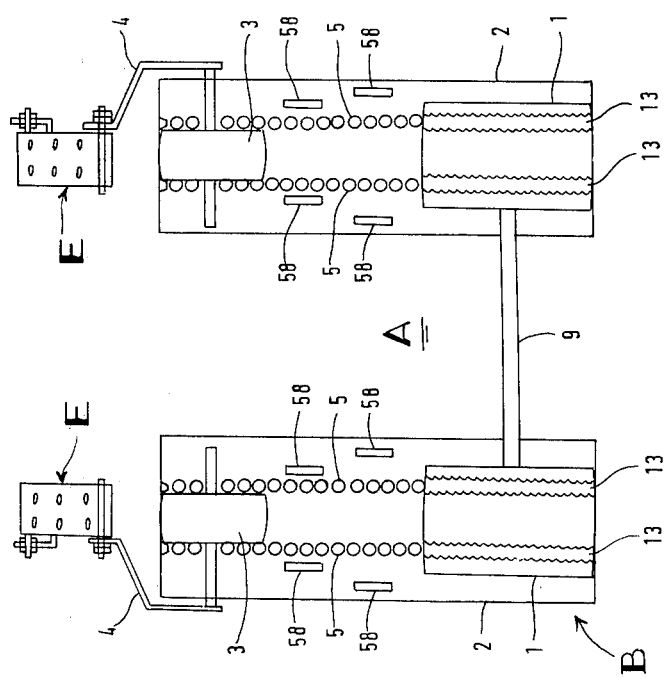
FIG. 3 is a plan view of the driving mechanism with the upper portion of the track removed to show the V-groove configuration in the driving wheels.

FIG. 8, appearing on the same sheet as FIG. 5, is an exploded view of the auxiliary wheel pivot arm support and track adjustment mechanism.

FIG. 9, appearing on the same sheet as FIG. 5, is a plan view of the auxiliary wheel assembly and track adjustment mechanism.

FIGS. 10, 11 and 12 are an exploded view, a side view and a front view of the bogie wheel and support assembly respectively.

FIG. 13, appearing on the same sheet as FIG. 6, is a detailed view of the bogie wheel link and adjustment rod.

FIG. 14, appearing on the same sheet as FIG. 6, is an exploded view of the adjustable auxiliary wheel spring suspension mechanism.

FIG. 15, appearing on the same sheet as FIG. 5, is an exploded view of the bogie wheel assembly.

As thus illustrated the vehicle is designated in its entirety by reference character A. Reference character B designates in its entirety the track wheel driving mechanism of the vehicle and C designates the front end of the vehicle which could support the front guiding wheels or skis, whichever is applicable to the terrain on which the vehicle will be used. Reference character D designates in its entirety the bogie wheel assembly support. Reference character E designates the auxiliary wheel pivot arm support and track adjustment mechanism and reference character F designates the adjustable auxiliary wheel spring suspension mechanism.

Referring to FIGS. 1 and 4, the track 2 consists preferably of a suitable fabric and rubber composition or some suitable flexible plastic material and has rows of protrusions 5 which project inwardly from the inside surface of the belt. The protrusions may be attached to the belt by way of rivets 6 which are preferably of brass, the protrusion assembly including a washer 7 also preferably of brass. Since the material of the track and of the protrusions is preferably of a moldable material, it is contemplated that the protrusions or cones 5 and the track 2 could be molded as an integral track. The track 2 is positioned so that when assembled on the vehicle the rows of cones 5 are in contact with the sides of auxiliary wheel 3, thereby guiding track 2 continually around the wheel 3.

The rows of cones 5 also engage in cone receiving holes 8 in the driving wheels 1. The holes 8 are circumferentially aligned and positioned to overlap one with the next to form a pair of parallel V-shaped grooves 13, the grooves being aligned with the rows of cones 5. The V-grooves in the driving wheel 1 have corrugated sides due to the close proximity and overlap of the holes 8 to each other. The cones 5 engage the holes 8 and the sides of grooves 13 as the driving wheels rotate, thereby providing a non-slip contact therebetween, allowing the driving wheel 1 to propel the track 2. Thus, the principle of the cones in the corrugated V-groove 13 operates as a toothed sprocket, but in reverse, there being no need to have sprocket holes in the track. It should also be noted that the track is entirely of a flexible material and has no external large metal lugs which tend to reduce the attainable top speed of a vehicle. Thus, a vehicle utilizing the track system of the present invention is not limited in its top speed as are other such vehicles.

Track 2 is kept in longitudinal alignment and tension by auxiliary wheel 3 being vertically positioned inside the front portion of the track a short distance from driving wheel 1 and centered between the two rows of cones. The width of wheel 3 being sufficient to just fit between the two rows of cones 5 thereby prevents any sideways relative movement between the track and the auxiliary wheel.

With reference now to FIGS. 6, 7 and 9, it is seen that auxiliary wheel 3 is attached by means of bolt 38 to hub 39 which in turn is mounted on auxiliary wheel axle 30 by bearings 37. The hub and bearing assembly is kept in lateral adjustment on auxiliary axle 30 by collars 36. Auxiliary wheel axle 30 is welded to one end of longitudinal pivot arm 4. The other end of longitudinal pivot arm 4 is attached as by welding to a pivot tube 29. The pivot tube 29 is secured to pivot rod 17 through hole 23 in adjustment plate 10 by means of nuts 18 and 19. Pivot rod 17 is in turn secured to adjustment plate 10 which is slidably arranged within fixed plate 11, both plates 10 and 11 being U-shaped so that plate 10 fits exactly within plate 11 allowing no side motion of plate 10 within plate 11. Plate 10 is secured within plate 11 by means of bolt 12 inserted through holes 21 of plate 11 and through slots 31 of plate 10 (see FIG. 8) and secured by nuts 15 and 16 in a conventional double nut lock fashion thereby allowing longitudinal movement of plate 10 within plate 11 but preventing up and down motion of plate 10 within plate 11.

The sliding of plate 10 within plate 11 is controlled by means of rod 25 which is fastened at one end through slot 33 of plate 11 to plate 10 through threaded hole 24 and locked in position by means of nut 28 (FIGS. 7 and 8). The other end of rod 25 passes through hole 80 in plate 20 and is secured by means of nuts 26 and 27 respectively positioned on opposite sides of plate 20, the latter being welded to plate 11. Plate 11 is in turn secured to vehicle A through slots 34 by means of bolts 14, slots 34 permitting lateral and longitudinal adjustment of plate 11 and consequently of auxiliary wheel 3 in relation to the body of vehicle A. Rod 25 thereby provides a means of controlling the movement of plate 10 within plate 11 and locking of plate 10 in the desired position within plate 11 with respect to the vehicle body.

The movement of plate 10 being transmitted directly through auxiliary wheel pivot arm 4 to wheel 3 which is resting inside track 2 permits adjusting of the tension of the track 2 as required.

As seen in FIG. 2 the swing or arc of pivot arm 4 around the pivot rod 17 causes auxiliary wheel axle 30 to move in an arc which in turn causes a pulling or pushing action on bogie linkage rod 45. Bogie linkage rod 45 is attached at one end to nut 75 which is welded to tube 35 and locked in position by nut 76, tube 35 itself being inserted around auxiliary wheel axle 30 and between collar 36 and pivot arm 4. At the other end it is welded to nut 47 which in turn is welded to slotted plate 46, thereby providing a means of adjusting the length of bogie linkage rod 45. As viewed in FIGS. 10, 11 and 12 plate 46 is fastened to each end of bogie assembly shaft 48 by means of bolt 49. Bogie assembly shaft 48 is inserted through tubes 69 and 70 which constitute the central pivot point of bogie components 59 and 60 to which are attached the bogie wheels 58 (FIG. 15). The longitudinal positioning of the wheels 48 is accomplished by lengthening or shorteninng of bogie linkage rod 45. The lateral positioning of bogie wheels assembly is accomplished by means of yoke 51 the bottom end of which is attached to bogie assembly shaft 48 by means of bolt 49 through bushing 52 in hole 71.

The top end of yoke 51 is attached to bogie support 55 by means of bolt 53 and nut 54 through holes 56 and 57. The lateral adjustment of the bogie assembly is controlled by spacers 50 inserted as required between plates 46 and yoke 51 on retaining bolt 49. The forward inclination of yoke 51 pivoted between bolts 53 and 49 causes shaft 48 of the bogie assembly to move downward when bogie linkage rod 45 is pulled forward by the upward motion of auxiliary wheel 3 as demonstrated by FIGS. 11 and 2. The downward movement of bogie assembly shaft 48 in turn causes flexing of the bogie spring 61 yielding downward pressure on the bogie wheels 58. The upper motion of auxiliary wheel 3 upon encountering an obstacle causes therefore a downward push on the bogie wheel assembly, pushing downwards on the track 2 which causes the vehicle to rise in anticipation of the obstacle. The counteraction of the bogie wheel springs 61 being flexed downward results in a resistance to bogie linkage rod 45 being pulled forward, which resistance is imparted to auxiliary wheel 3, thereby limiting its upward travel. Following this, when the bogie assembly itself encounters the obstacle the upward motion of the bogie assembly causes in upward and backwards movement of bogie shaft 48 which by pulling on bogie linkage rod 45 yields a downward pressure on auxiliary wheel 3 thus distributing the impact of the obstacle between both the bogie assembly and auxiliary wheel 3. The tension of the bogie assembly is controlled by adjustment holes 56 and the length of bogie linkage rod 45. The inclination of the yoke 51 is controlled by holes 57 and the length of bogie linkage rod 45. The angle of the yoke 51 controls the relative amount of downward pressure applied to the bogie wheel assembly and the auxiliary wheel.

Further combinations of pressure application to auxiliary wheel 3 can be obtained by means of a coil spring 62 being held at one end in spring retaining cup 42 which is fastened by means of bolt 74 to lever 68 which in turn is welded to pivot arm 4 and is held at the other end in spring retaining cup 63 which is welded to adjustment rod 64 which in turn is fastened to spring support plate 67 by adjustment nuts 65 and 66. Plate 67 is itself attached to the body of vehicle A by means of bolts 73.

The pressure of spring 62 against spring retaining cup 42 to bolt 74 and to lever 68 causes a downward pressure to be applied to pivot arm 4 and consequently to auxiliary wheel 3. The pivoting action of spring retaining cup 42 about bolt 74 helps the cup maintain its correct alignment in relation to spring 62 and cup 63.

The swing or arc of pivot arm 4 around the pivot rod 17 causes auxiliary wheel 3 to move in an arc which causes the track to be tightened whenever the auxiliary wheel is raised or lowered by the irregularities of the terrain. This movement of the pivot arm 4 also provides an automatic limit to the upper and lower travel of the auxiliary wheel, which limit depends on the stretchability of the track 2. This limiting action caused by the arc of pivot arm 4 is independent of the limiting action caused by the action of the bogie wheel assembly and is necessary for the summer configuration of the track system where the bogie may be removed. The prime purpose of the bogie assembly is to distribute the weight of the vehicle more evenly on the track giving more flotation and traction on fluffy snow. In other than snow covered terrains, the ground being more solid and flotation being less important, the bogie wheel assembly is removed to relieve the vehicle of the rolling resistance created by it and to avoid its vulnerability to inflexible obstacle such as sharp rocks, thick branches and logs which are normally not encountered in the winter. Removal of the bogie assembly as a unit is accomplished by the loosening of nut 76, removal of bogie linkage rod 45 from welded nut 75 and removal of bolts 53.

In this summer configuration, the bogie wheel assembly being removed, a spring 62 is normally inserted between spring retaining cups 42 and 63, to provide downward pressure on the auxiliary wheel 3 for traction and smooth ride.

It should be noted that the track system provides a simple means for adjusting the tension of the track, the longitudinal and lateral adjustment of the auxiliary wheel and bogie assembly as well as the ground pressure of, and the relative weight distribution between, the auxiliary wheel and bogie assembly, all of which permit the desired adjustment for a smooth ride and for traction over various conditions of terrain.

It should be noted that removal of the track, the auxiliary wheel and bogie assembly as one unit can be accomplished by first loosening the track tension by means of nuts 15, 16 and nut 27 then by removal of nuts 18 and 19 and removal of bolts 53.

In this configuration the vehicle can then be driven by means of driving wheels 1 as an ordinary vehicle. This arrangement permits higher speed on smooth terrain or roads where tracks are not desired.

As described this invention provides a novel half track system which is rugged, reliable, long lasting, fully adjustable as to alignment, easily mounted and dismounted, adjustable as to ride, relatively economical and which provides suitable traction in all variations of terrain.

While the present invention has been shown utilizing the auxiliary wheels in a position forward of the driving wheels, it is understood that they could equally be placed behind the driving wheels. It should also be pointed out that contrary to most systems utilizing auxiliary wheels in a manner similar to their use herein, the auxiliary wheels of the present invention are not attached to the driving wheel axle. Thus, the auxiliary wheels can move independent of the driving wheel and the weight of the entire suspension system is kept to a minimum.

Applicant does not wish to be understood as limiting his invention to the specific details shown. Although a specific embodiment of the invention has been illustrated and described, it will be understood that various alterations in the details of construction may be made without departing from the spirit and scope of the invention as indicated by the appended claims.

We claim:

1. A half track attachment for a vehicle, said attachment comprising a pair of driving wheels, a pair of flexible endless tracks, a pair of auxiliary wheels spaced a distance from said driving wheels for engageably guiding said tracks, a plurality of spaced longitudinally aligned protrusions directed inwardly from the inside surface of each of said tracks, and a plurality of circumferentially aligned and radially inwardly directed protrusion receiving holes in each of said driving wheels, the holes in each driving wheel being positioned so that each hole overlaps the next to form a circumferential groove having generally corrugated protrusion engaging sides, whereby the holes in said driving wheels may coact with the protrusions on said tracks such that each driving wheel may engage and propel its own track.

2. A half track attachment according to claim 1 wherein said protrusions are aligned in a pair of parallel rows on each of said tracks, said rows being spaced apart so as to receive one of said auxiliary wheels therebetween for guiding said track thereon.

3. A half track attachment according to claim 2, wherein each of said auxiliary wheels is rotatably mounted to one end of a pivot arm, the other end of which is pivotally attached to the vehicle body thereby permitting arcuate movement of the auxiliary wheels relative to the body, and further including a removable bogie wheel assembly located between each said driving wheel and the corresponding auxiliary wheel and adjusting means connecting said bogie wheel assembly to said corresponding auxiliary wheel for downward motion relative thereto in response to said arcuate movement.

4. A half track attachment according to claim 3 wherein said bogie assembly comprises a set of bogie wheels pivotally sprung on an axle which is pivotally attached to a yoke connected to said body, said adjusting means including adjustable linkage rod means joining said axle to said auxiliary wheel whereby said downward movement of said bogie wheel assembly is constrained by movement of each said auxiliary wheel.

5. A half track attachment according to claim 4 and including resilient means between each said auxiliary wheel and said body for biasing each of said auxiliary wheels in a direction to ensure contact of said track with the ground.

* * * * *